(12) United States Patent
Li et al.

(10) Patent No.: US 11,687,704 B2
(45) Date of Patent: Jun. 27, 2023

(54) METHOD, APPARATUS AND ELECTRONIC DEVICE FOR ANNOTATING INFORMATION OF STRUCTURED DOCUMENT

(71) Applicant: BEIJING BAIDU NETCOM SCIENCE TECHNOLOGY CO., LTD., Beijing (CN)

(72) Inventors: Qiaoyi Li, Beijing (CN); Xiangkai Huang, Beijing (CN); Yulin Li, Beijing (CN); Ju Huang, Beijing (CN); Xiameng Qin, Beijing (CN); Duohao Qin, Beijing (CN); Minghao Liu, Beijing (CN); Junyu Han, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 139 days.

(21) Appl. No.: 17/207,179

(22) Filed: Mar. 19, 2021

(65) Prior Publication Data

US 2021/0390133 A1 Dec. 16, 2021

(30) Foreign Application Priority Data

Jun. 12, 2020 (CN) .......................... 202010538181.9

(51) Int. Cl.
*G06F 7/02* (2006.01)
*G06F 16/00* (2019.01)
(Continued)

(52) U.S. Cl.
CPC ............ *G06F 40/174* (2020.01); *G06F 16/93* (2019.01); *G06V 30/19013* (2022.01);
(Continued)

(58) Field of Classification Search
CPC ......... G06F 16/93; G06F 40/186; G06K 9/62; G06V 10/751; G06V 30/19013
See application file for complete search history.

(56) References Cited

U.S. PATENT DOCUMENTS 10,489,682 B1 11/2019 Kumer
11,257,006 B1 * 2/2022 Anschel ................. G06N 20/00
(Continued)

FOREIGN PATENT DOCUMENTS

CN 103186633 A 7/2013
CN 107977665 A 5/2018
(Continued)

OTHER PUBLICATIONS

B. Gatos et al, "Adaptive degraded document image binarization," Pattern Recognition vol. 39 pp. 317-327, 2006. (Year: 2006).*
The EESR of EP application No. 21163639.4.
NPL1: "DocEmul: a Toolkit to Generate Structured Historical Documents", 2017 14th IAPR International Conference on Document Analysis and Recognition, IEEE, vol. 1, Nov. 9. 2017, pp. 1186-1191.
(Continued)

*Primary Examiner* — Bruce M Moser
(74) *Attorney, Agent, or Firm* — J.C. Patents

(57) ABSTRACT

Disclosed are a method, apparatus and electronic device for annotating information of a structured document. A specific implementation is: obtaining a template image of a structured document and at least one piece of annotation information of a field to be filled in the template image, where the annotation information includes attribute value and historical content of the field to be filled, and historical position of the field to be filled in the template image; generating, according to the attribute value of the field to be filled, the historical content of the field to be filled and the historical position of the field to be filled in the template image, target filling information of the field to be filled; obtaining, according to the target filling information of the field to be filled, an image of an annotated structured document.

11 Claims, 5 Drawing Sheets

(51) Int. Cl.
*G06F 40/174* (2020.01)
*G06F 16/93* (2019.01)
*G06V 30/40* (2022.01)
*G06V 30/19* (2022.01)
*G06V 30/10* (2022.01)

(52) U.S. Cl.
CPC ........ *G06V 30/19173* (2022.01); *G06V 30/40* (2022.01); *G06V 30/10* (2022.01)

(56) References Cited

U.S. PATENT DOCUMENTS

| | | | |
|---|---|---|---|
| 2002/0169803 | A1 | 11/2002 | Sampath |
| 2011/0307435 | A1 | 12/2011 | Overell |
| 2012/0254730 | A1 | 10/2012 | Sunderland |
| 2016/0239473 | A1 | 8/2016 | Foyer |
| 2017/0351655 | A1* | 12/2017 | Zheng .................. G06F 40/186 |
| 2019/0243841 | A1 | 8/2019 | Hoffmann |
| 2020/0065857 | A1 | 2/2020 | Lagi |
| 2021/0373727 | A1* | 12/2021 | Malik ..................... G06F 16/93 |

FOREIGN PATENT DOCUMENTS

| | | |
|---|---|---|
| CN | 108984683 A | 12/2018 |
| CN | 109086756 A | 12/2018 |
| CN | 109977957 A | 7/2019 |
| CN | 110674627 A | 1/2020 |
| CN | 110689447 A | 1/2020 |
| DE | 10162155 A1 | 7/2002 |
| JP | 6590355 B1 | 10/2019 |
| KR | 20190110873 * | 10/2019 |

OTHER PUBLICATIONS

NPL2: "Automatic generation of a custom corpora for invoice analysis and recognition", 2019 International Conference on Document Analysis and Recognition Workshops (ICDARW), IEEE vol. 7, Sep. 22, 2019.
NPL3: "DocCreator: A New Software for Creating Synthetic Ground-Truthed Document Images", Journal of Imaging, vol. 3, No. 4, Dec. 11, 2017.
NPL4: "The Effectiveness of Data Augmentation in Image Classification using Deep Learning", Arxiv.org, Cornall University Library, 201 Olin Library Cornell University Ithaca, NY 14853, Dec. 13, 2017.
First Office Action of the parallel application JP2021-047581.
NPL: "Automatic generation of a custom corpora for invoice analysis and recognition", 2019 International Conference on Document Analysis and Recognition Workshops (ICDARW), IEEE, Sep. 22, 2019, https://ieeexplore.ieee.org/document/8892875.
First Office Action of the priority application CN202010538181.9.
First Office Action of the parallel application EP21163639.4.
"An Image Inpainting Technique Based on the Fast Marching Method", Journal of Graphics Tools, vol. 9, No. 1: 23-34.
"Construction of Smart Flood Control Document Generation Model Based on Cloud Platform", Water Resources Information, No. 3, Jun. 2013.
"Extracting structured data from invoices", Xavier Holt and Andrew Chisholm, 2018, In Proceedings of Australasian Language Technology Association Workshop, pp. 53-59.
"Fusion and realization of structured and unstructured data in digital research and development systems", Journal of Computer Applications, 2017, 37( S2) : 241-243.

* cited by examiner

METHOD, APPARATUS AND ELECTRONIC DEVICE FOR ANNOTATING INFORMATION OF STRUCTURED DOCUMENT

CROSS-REFERENCE TO RELATED APPLICATIONS

This application claims priority to Chinese Patent Application No. 202010538181.9, filed on Jun. 12, 2020, which is hereby incorporated by reference in its entirety.

TECHNICAL FIELD

Embodiments of the present application relate to artificial intelligence technology, deep learning technology, and big data technology in the field of computer technologies, and in particular, to a method, apparatus and electronic device for annotating information of a structured document.

BACKGROUND

Invoices, receipts, detailed statements, card certificates, etc. are common document forms in daily work and life, which are characterized by including a large number of word structures with key-value correspondences and word structures in tabular form, i.e., including structured words. Usually, users can only get paper versions or photos of these documents. In some scenarios, it is necessary to extract key information that can be stored in a structured way from the paper documents or document photos of these documents, so as to make these documents electronic. Where extracting the key information that can be stored in a structured way involves related technologies of image text recognition, such as word detection, structured parsing, end-to-end word detection and recognition, table extraction and so on. However, the realization of related technologies of the image text recognition usually needs to use a large amount of annotation data for algorithm training. However, due to complicated layout of documents such as invoice, receipt, detailed statement and card certificate and large changes between the same layouts, a large labor cost and time are required for annotating if a manual annotation is used. To solve this problem, an automatic annotation method that automatically generates annotation data can be used.

In the prior art, a method for automatically generating annotation data is proposed, and in this method, a frame of background image is selected first, and then a word is randomly written at any position in the background image, and after multiple random writing, multiple annotation data can be obtained.

However, the method in the prior art cannot be applied to automatic annotation of a document containing structured data such as invoices, receipts, detailed statements, card certificates, etc.

SUMMARY

The present application provides a method, an apparatus and an electronic device, for annotating information of a structured document.

According to an aspect of the present application, there is provided a method for annotating information of a structured document, including:

obtaining a template image of the structured document and at least one piece of annotation information of a field to be filled in the template image, where the annotation information includes an attribute value of the field to be filled, a historical content of the field to be filled, and a historical position of the field to be filled in the template image;

generating, according to the attribute value of the field to be filled, the historical content of the field to be filled and the historical position of the field to be filled in the template image, target filling information of the field to be filled, where the target filling information includes: a target filling position, a target filling content and a target filling format; and obtaining, according to the target filling information of the field to be filled, an image of an annotated structured document.

According to another aspect of the present application, there is provided an apparatus for annotating information of a structured document, including:

an obtaining module, configured to obtain a template image of the structured document and at least one piece of annotation information of a field to be filled in the template image, where the annotation information includes an attribute value of the field to be filled, a historical content of the field to be filled and a historical position of the field to be filled in the template image; and a processing module, configured to generate target filling information of the field to be filled according to the attribute value of the field to be filled, the historical content of the field to be filled, and the historical position of the field to be filled in the template image, where the target filling information includes: a target filling position, a target filling content and a target filling format; and to obtain an image of an annotated structured document according to the target filling information of the field to be filled.

According to still another aspect of the present application, there is provided an electronic device, including:

at least one processor; and a memory communicatively connected with the at least one processor; where the memory stores instructions executable by the at least one processor, and the instructions are executed by the at least one processor to cause the at least one processor to perform the method according to the first aspect.

According to yet another aspect of the present application, there is provided a non-transitory computer-readable storage medium storing computer instructions for causing a computer to execute the method according to the first aspect.

According to the technology of the present application, based on a pre-generated template image and an attribute value, a historical content and a historical position of a field to be filled, a target filling information that is different from the historical content and the historical position but has consistent or similar semantics can be generated, and based on the target filling information, an image of an annotated structured document can be obtained, thereby realizing rapid and accurate annotation of the structured document. After this embodiment is executed multiple times, it can be realized that a large number of virtual structured documents that have consistent or similar semantics can be generated by providing only one image of an original document, so as to be used in subsequent algorithm training and other processes.

It should be understood that the description in this section is not intended to identify key or important features of the embodiments of the present application, nor is it intended to limit the scope of the present application. Other features of the present application will become apparent from the following description.

BRIEF DESCRIPTION OF THE DRAWINGS

The accompanying drawings are used for better understanding of the solutions of the present application, and do not constitute a limitation to the present application. Where.

DESCRIPTION OF EMBODIMENTS

The exemplary embodiments of the present application are illustrated below in conjunction with the accompanying drawings, including various details of the embodiments of the present application for ease of understanding, and the embodiments should be considered as merely exemplary. Therefore, those of ordinary skill in the art should recognize that various changes and modifications can be made to the embodiments described herein without departing from the scope and spirit of the present application. Likewise, for the sake of clarity and conciseness, descriptions of well-known functions and structures are omitted in the following description.

An existing method of automatically generating annotation data is firstly selecting a frame of background image, then randomly writing a word at any position in the background image, and after multiple random writing, obtaining multiple annotation data.

For invoices, receipts, detailed statements, card certificates, etc., they all contain structured data, which has a specific position and a specific format in the document. Therefore, for example, if the method in the prior art is used, it cannot be guaranteed that the structured data is filled with a correct content corresponding to an attribute value at a correct position. Therefore, the method in the prior art cannot be applied to an automatic annotation of documents containing structured data such as invoices, receipts, detailed statements and card certificates.

In view of the problem in the prior art that the method of randomly writing a word in an entire frame of image for annotation cannot be applied to a document containing structured data, an embodiment of the present application annotates an image based on an actual structure of a document with structured data, and an actual position and content of a field in the image of the document, thereby realizing a rapid and accurate annotation of a structured document.

For ease of description, in the following embodiments of the present application, documents containing structured data are collectively referred to as structured documents.

Figure 1:
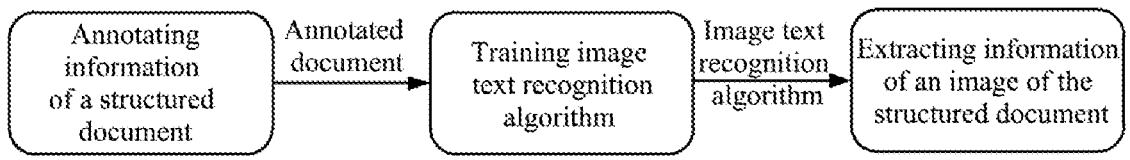
FIG. 1 is a schematic diagram of an exemplary scenario of a method for annotating information of a structured document provided by an embodiment of the present application.

FIG. 1 is a schematic diagram of an exemplary scenario of a method for annotating information of a structured document provided by an embodiment of the present application. As shown in FIG. 1, the method can be applied to a scenario of extracting information of the structured document. In this scenario, the method for annotating information of the structured document according to the present application can be firstly used to obtain a large number of annotated documents of a certain type of structured document, and these documents can all be in the form of images. Further, the large number of annotated documents obtained in the present application are used to train an image text recognition algorithm for extracting the structured document. Then, information is extracted from an image of an actual structured document based on a trained image text recognition algorithm.

Annotating the information of the structured document, training the image text recognition algorithm and extracting the information of the image of the actual structured document based on the trained image text recognition algorithm, which are involved in this scenario, can be completed in the same electronic device, for example, they are all completed in the same server, or they can also be completed in different electronic devices. There is no specific limitation on this in the embodiment of the present application.

Figure 2:
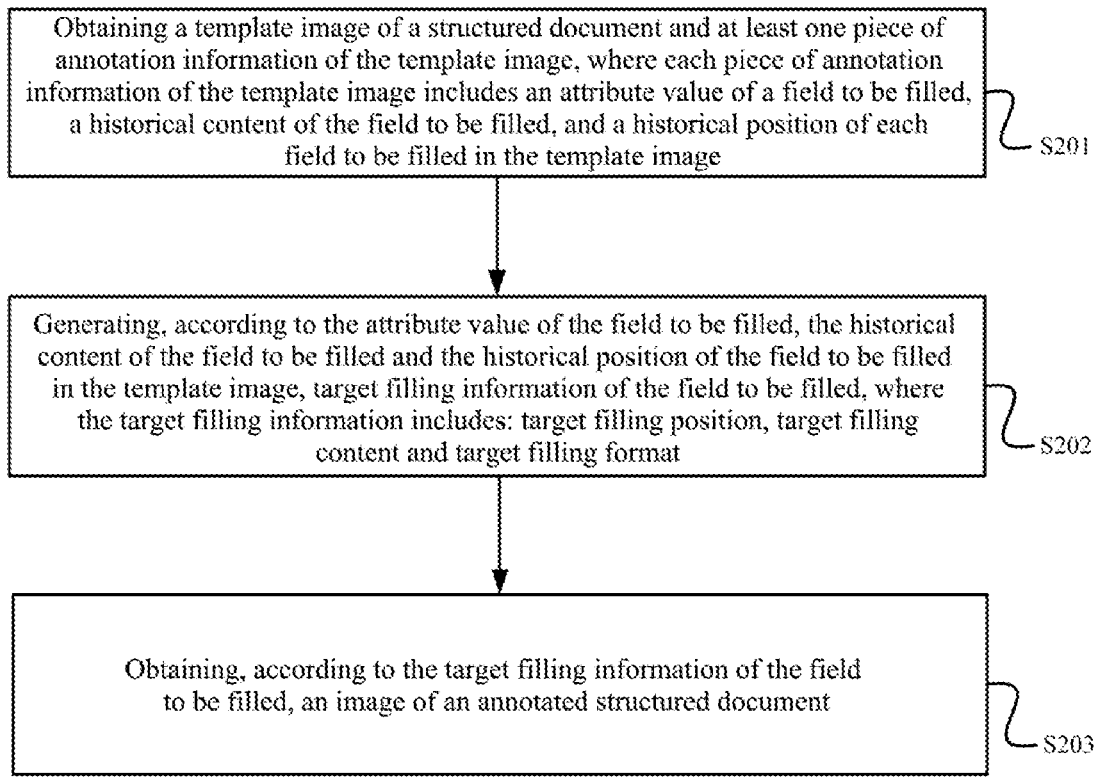
FIG. 2 is a schematic flowchart of a method for annotating information of a structured document provided by an embodiment of the present application.

FIG. 2 is a schematic flowchart of a method for annotating information of a structured document provided by an embodiment of the present application, and an executive entity of the method can be the aforementioned electronic device, such as the aforementioned server. As shown in FIG. 2, the method includes:

S201, obtaining a template image of a structured document and at least one piece of annotation information of the template image, where each piece of annotation information of the template image includes an attribute value of a field to be filled, a historical content of the field to be filled, and a historical position of each field to be filled in the template image.

As mentioned above, a structured document refers to a document containing structured data, and the structured data may refer to data with a specific position and a specific format. For example, an invoice is used as a structured document, in which each of data has a fixed position and a fixed format.

The template image of the structured document and the annotation information in the template image can be generated in advance, and a specific process will be described in detail in the following embodiment.

Each template image can have at least one piece of annotation information.

Optionally, one field to be filled can correspond to one piece of annotation information. When generating the above template image, the field to be filled will be smeared out, and in the following processing, a new content will be written to a position where the field to be filled is, thereby completing an automatic annotation of data.

Where one piece of annotation information includes the attribute value and the historical content of the field to be filled, and the historical position of the field to be filled in the template image.

The attribute value of the field to be filled may also be referred to as category of the field to be filled. Content of the field to be filled may refer to an actual value of the field to be filled. For example, if a field to be filled in an invoice document is "Zhang San", i.e., a person's name, then the attribute value of the field to be filled is "Name" and the content thereof is "Zhang San".

The historical content of the field to be filled can be read directly from an original image when the template image is generated, and the attribute value of the field to be filled can be obtained according to a relationship between fields when the template image is generated.

In a structured document, several attributes such as key, value, table key and table_value may be involved. Where key and value may appear in pairs, and table key and table_value may appear in pairs. Exemplarily, if an attribute of a field to be filled in a structured document is value, the attribute value of the field may refer to content of a field that is associated with the field and the attribute is key. For example, if the field to be filled is "Zhang San", and is associated with the "Name" field, the attribute value of the field to be filled is "Name".

The historical position of the field to be filled may indicate a position of an area occupied by the field to be filled in the template image. For example, the historical position may include an upper left pixel position, a lower right pixel position or a center position of the area occupied by the field to be filled in the template image.

S202, generating, according to the attribute value of the field to be filled, the historical content of the field to be filled and the historical position of the field to be filled in the template image, target filling information of the field to be filled, where the target filling information includes: target filling position, target filling content and target filling format.

Optionally, the target filling position may refer to the position of the area occupied by the field to be filled in the annotated structured document to be generated, for example, the upper left pixel position and the lower right pixel position of the area. The target filling content refers to a word required to be filled in the field to be filled in the annotated structured document to be generated. The target filling format may include: font and size of the word filled in the field to be filled.

Optionally, based on the attribute value, the historical content and the historical position of the field to be filled, that is, actual content and actual position of the field to be filled, the historical content and the historical position can be adjusted correspondingly, so as to obtain the target filling information that is different from the field information in the original document but has consistent or similar semantics.

S203, obtaining, according to the target filling information of the field to be filled, an image of an annotated structured document.

Optionally, based on the above target filling information, field information that is different from an original field to be filled but has consistent or similar semantics can be written in the template image, so as to obtain an image of an annotated structured document.

After the above process is executed multiple times, a large number of annotated documents that are different from each other but are semantically consistent with or similar to an original structured document can be obtained.

In the present embodiment, based on the pre-generated template image and the attribute value, the historical content and the historical position of the field to be filled, the target filling information that is different from the historical content and the historical position but has consistent or similar semantics can be generated, and based on the target filling information, the image of the annotated structured document can be obtained, thereby realizing rapid and accurate annotation of the structured document. After this embodiment is executed multiple times, it can be realized that a large number of virtual structured documents that have consistent or similar semantics can be generated by providing only one image of an original document, so as to be used in subsequent algorithm training and other processes.

The following describes a process of generating target filling information based on the attribute value, the historical content and the historical position of the field to be filled in step S202.

Figure 3:
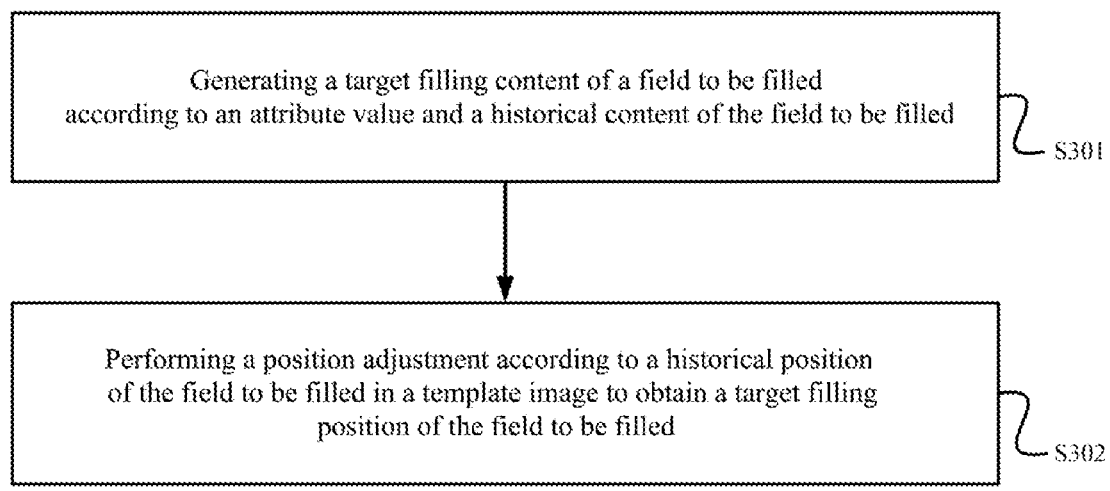
FIG. 3 is a schematic flowchart of a method for annotating information of a structured document provided by an embodiment of the present application.

FIG. 3 is a schematic flowchart of a method for annotating information of a structured document provided by an embodiment of the present application. As shown in FIG. 3, an optional implementation of the foregoing step S202 includes:

S301, generating the target filling content of the field to be filled according to the attribute value and the historical content of the foregoing field to be filled.

The attribute value of the field to be filled may represent a category of the field, such as age, name, etc. The historical content of the field to be filled may represent the actual content of the field to be filled in the original document, such as "Zhang San". Based on the two pieces of information, the target filling content of the field to be filled is generated, which can make that the target filling content is consistent with the attribute value of the field to be filled and may be different in content.

S302, performing a position adjustment according to the historical position of the field to be filled in the template image to obtain the target filling position of the field to be filled.

It should be noted that the above steps S301 and S302 can be performed in no particular order.

Exemplarily, based on the historical position of the field to be filled in the template image, the historical position can be adjusted upward or downward by a certain value, so that the obtained target filling position is based on the historical position, and is different from the historical position.

In the present embodiment, the target filling content is generated based on the historical content and the attribute value, and the target filling position is generated based on the historical position, so that the annotated structured document generated based on the target filling content and the target filling position is semantically consistent with or similar to the content of the original document, and meanwhile has a certain difference, thereby results in diversity of subsequently obtained multiple annotated structured documents.

The following describes a process of generating the target filling content of the field to be filled in step S301.

As an optional implementation, it can be firstly determined whether an attribute value of the field to be filled or a reference attribute value whose difference from the attribute value of the field to be filled is less than a preset value exists in a preset corpus. If it exists, a reference content can be randomly selected from a content corresponding to the attribute value of the field to be filled or a content corresponding to the reference attribute value, and the reference content is used as the target filling content of the field to be filled.

Optionally, the foregoing preset corpus may be generated by collecting a large amount of actual corpora in advance, and the preset corpus may include contents belonging to various attribute values. Exemplarily, for the attribute value "name", a large number of actual names can be recorded in the preset corpus, such as "Zhang San", "Li Si" and "Wang Wu". These actual names are all associated with the attribute value "name", identifying that these actual names belong to "name".

After obtaining the attribute value of the field to be filled, it is determined whether the attribute value of the field to be filled exists in the preset corpus, and if it exists, a reference content can be randomly selected from a content corresponding to the attribute value and is used as a content to be filled. If it does not exist, it is continued to determine whether a reference attribute value whose difference from the attribute value of the field to be filled is smaller than the preset value exists in the preset corpus, and if it exists, a reference content can be randomly selected from a content corresponding to the reference attribute value and is used as a content to be filled.

Where the reference attribute value whose difference from the attribute value of the field to be filled is less than the preset value may be a near-synonym of the attribute value of the field to be filled. Exemplarily, if the attribute value of the field to be filled is "name", the reference attribute value may be "apellation" or the like.

In the present embodiment, when the attribute value of the field to be filled or the reference attribute value close to the attribute value exists in the preset corpus, the content corresponding to the attribute value or the reference attribute value can be randomly selected as the target filling content, which can make the target filling content conform to the attribute of the field to be filled, i.e., semantically consistent with or similar to the field to be filled, and meanwhile ensures the diversity of the target filling content.

As another optional implementation, if it is confirmed through the foregoing determination that neither the attribute value of the field to be filled nor the reference attribute value whose difference from the attribute value of the field to be filled is less than the preset value exists in the preset corpus, then a part-of-speech of the historical content of the field to be filled is determined, and the target filling content of the field to be filled is generated according to whether a content corresponding to the part-of-speech of the historical content of the field to be filled exists in the preset corpus.

Optionally, a part-of-speech analysis can be performed on the historical content of the field to be filled to obtain the part-of-speech of the field to be filled.

Further, the target filling content of the field to be filled can be generated according to whether the content corresponding to the part-of-speech of the historical content of the field to be filled exists in the preset corpus.

In the present embodiment, by determining the part-of-speech of the historical content and generating the target filling content according to whether the content corresponding to the part-of-speech of the historical content of the field to be filled exists in the preset corpus, a filling content close to the actual content of the field to be filled can be obtained as much as possible when the content of the attribute value of the field to be filled does not exist in the preset corpus.

Generating the target filling content of the field to be filled according to whether the content corresponding to the part-of-speech of the historical content of the field to be filled exists in the preset corpus can be realized through the following process.

In an optional implementation, if the content corresponding to the part-of-speech of the historical content of the field to be filled exists in the preset corpus, then a reference content is randomly selected from the content corresponding to the part-of-speech of the historical content of the field to be filled, and the reference content is used as the target filling content of the field to be filled.

Optionally, the part-of-speech of all corpora can be recorded in the preset corpus. After determining the part-of-speech of the historical content of the field to be filled, the reference content is randomly selected from the content corresponding to the part-of-speech of the historical content, and is used as the target filling content.

Exemplarily, if the part-of-speech of the historical content of the field to be filled is a noun, then the target filling content selected in this way is a noun, not other part-of-speech, such as a verb or an adjective.

By the above way, the filling content close to the actual content of the field to be filled can be obtained as much as possible when the content of the attribute value of the field to be filled does not exist in the preset corpus, so as to prevent the generated target filling content from deviating significantly from the actual content of the field to be filled.

In another optional implementation, if the content corresponding to the part-of-speech of the historical content of the field to be filled does not exist in the preset corpus, the historical content of the field to be filled is used as the target filling content of the field to be filled.

If none of the foregoing conditions are met, it means that the content applicable to the field to be filled cannot be found in the preset corpus. In this case, the historical content can be directly used as the target filling content of the field to be filled.

In this way, it is possible to prevent the generated target filling content from deviating significantly from the actual content of the field to be filled.

Figure 4:
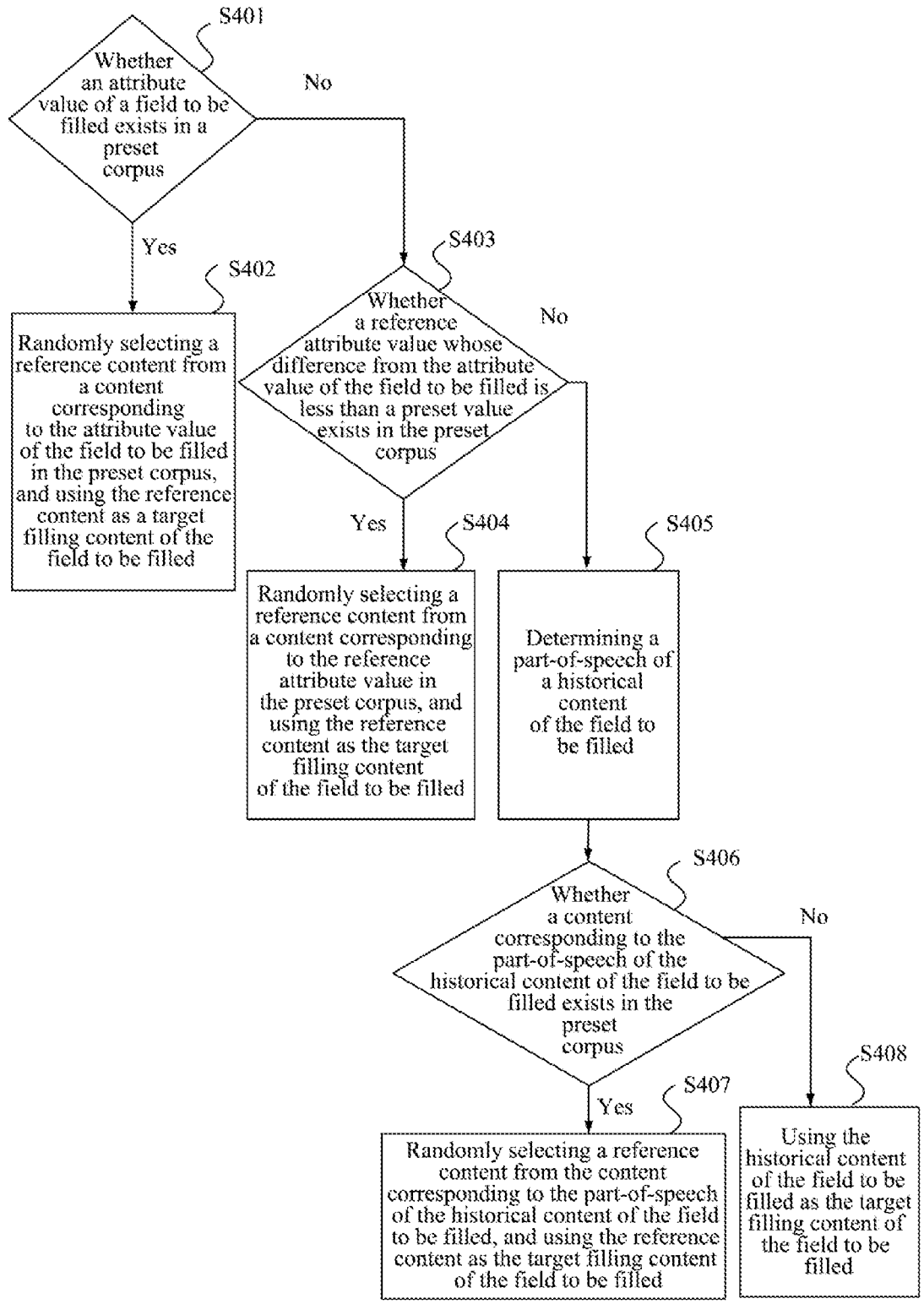
FIG. 4 is a schematic flowchart of generating a target filling content of a field to be filled based on a preset corpus.

FIG. 4 is a schematic flowchart of generating the target filling content of the field to be filled based on the preset corpus. As shown in FIG. 4, a generating process may include:

S401, determining whether the attribute value of the field to be filled exists in the preset corpus; if it exists, go to step S402; otherwise, go to step S403.

S402, randomly selecting a reference content from the content corresponding to the attribute value of the field to be filled in the preset corpus, and using the reference content as the target filling content of the field to be filled.

S403, determining whether the reference attribute value whose difference from the attribute value of the field to be filled is less than the preset value exists in the preset corpus; if it exists, go to step S404, otherwise, go to step S405.

S404, randomly selecting a reference content from the content corresponding to the reference attribute value in the preset corpus, and using the reference content as the target filling content of the field to be filled.

S405, determining the part-of-speech of the historical content of the field to be filled.

S406, determining whether the content corresponding to the part-of-speech of the historical content of the field to be filled exists in the preset corpus; if it exists, go to step S407; otherwise, go to step S408.

S407, randomly selecting a reference content from the content corresponding to the part-of-speech of the historical content of the field to be filled, and using the reference content as the target filling content of the field to be filled.

S408, using the historical content of the field to be filled as the target filling content of the field to be filled.

For the specific execution process of the above steps, please refer to the foregoing embodiments, and details will not be repeated here.

The following describes a process of performing the position adjustment according to the historical position of the field to be filled in the template image to obtain the target filling position of the field to be filled in step S302.

Figure 5:
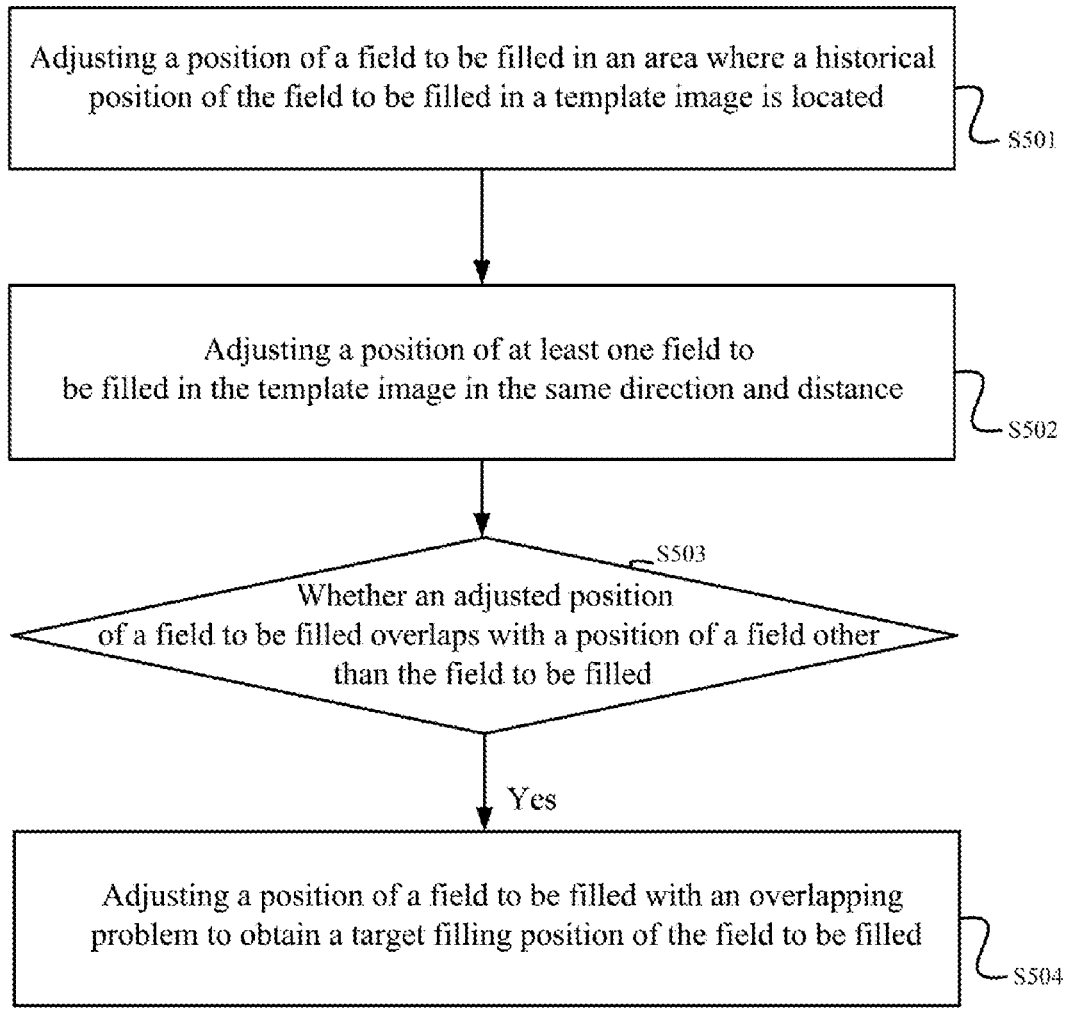
FIG. 5 is a schematic flowchart of a method for annotating information of a structured document provided by an embodiment of the present application.

FIG. 5 is a schematic flowchart of a method for annotating information of a structured document provided by an embodiment of the present application. As shown in FIG. 5, an optional implementation of the foregoing step S302 includes:

S501, adjusting a position of the field to be filled in an area where the historical position of the field to be filled in the template image is located.

Exemplarily, if the historical position of the field to be filled is in a center position of the area, the center position can be moved to the upper left by a certain number of pixels, and a moved position is recorded.

This step is to separately adjust the position of each field to be filled. In a specific implementation process, some or all of fields to be filled can be selected, and the above adjustment can be made for each field.

S502, adjusting a position of at least one field to be filled in the template image in the same direction and distance.

This step is to uniformly adjust positions of some or all of fields to be filled in the template image.

When uniformly adjusting the positions, positions of these fields to be filled are moved in the same direction and distance, that is, each field to be filled has the same position moving value.

S503, determining whether an adjusted position of a field to be filled overlaps with a position of a field other than the field to be filled; if yes, go to step S504, otherwise, using the adjusted position obtained in step S502 as the target filling position of the field to be filled.

S504, adjusting a position of a field to be filled with an overlapping problem to obtain the target filling position of the field to be filled.

After position adjustment in the above steps S501 and S501, a position of a certain field to be filled may overlap with a position of other field to be filled. Therefore, a position of a field to be filled with an overlapping problem can be adjusted to obtain the target filling position of the field to be filled.

Optionally, when a field to be filled overlaps with other field, a position of the field to be filled can be adjusted, or a position of the other field that overlaps with it can be adjusted.

It is worth noting that the position adjustment in the above steps S501 to S503 can be a random adjustment, i.e., performing a random position adjustment.

In the present embodiment, by performing individual position adjustment, uniform position adjustment and avoid-overlapping position adjustment on the field to be filled, the diversity of positions of the fields in the annotated structured document can be realized.

When performing the uniform position adjustment on each field to be filled in the above step S502, if the field to be filled is a field in a table, at least one of the following is performed:

adjusting positions of all rows of the table in the same direction and distance, and separately adjusting a position of each column of the table in the same direction and distance.

In this way, table information in an annotated structured document can be diversified, which is helpful for subsequent algorithm training.

The following describes a process of obtaining the image of the annotated structured document based on the target filling information in the above step S203.

In an optional implementation, the image of the annotated structured document can be obtained by filling the target filling content at the target filling position of the template image.

In this way, there is no need to consider a format of the field to be filled.

In another optional implementation, the image of the annotated structured document can be obtained by filling the target filling content in a target filling format at the target filling position of the template image.

In this way, the target filling content is filled to the target filling position in a specific target filling format, that is, the format of the filling content is considered.

In this way, the format of the fields in the image of the annotated structured document can be diversified, which is helpful for subsequent algorithm training.

Where the target filling format can be generated randomly while generating the target filling content and the target filling position.

As an optional implementation, the foregoing annotation information may also include a color of the field to be filled. Correspondingly, when obtaining the image of the annotated structured document based on the target filling information, the target filling content can be filled at the target filling position of the template image according to the target filling format and the color of the field to be filled, so as to obtain the image of the annotated structured document.

Exemplarily, if the color of the annotated field to be filled is red, the color of the target filling content filled in the image of the annotated structured document is red.

In this way, the information of the field in the image of the annotated structured document is enriched, which is helpful for subsequent algorithm training.

When the image of the annotated structured document is obtained as above, a word slice gray scale image can be generated for each field to be filled according to font, content, etc. Then, the binary word slice gray scale image is subjected to image transformation by randomly selecting an image processing operation such as blurring, histogram equalization and gray scale transformation, and the binary word slice gray scale image is fused with the background of the template image according to font color through Poisson blending or alpha channel blending, thereby achieving the effect of "writing" a word.

Further, it is also possible to perform data enhancement on the image of the annotated structured document obtained above. Exemplarily, data enhancement operations such as adding noise, scaling, elastic deformation, and color transformation are performed.

The following describes a process of generating the template image and the annotation information involved in the foregoing embodiments.

Optionally, a user can select a structured document in advance and take an image of the document to obtain an original image. Further, based on manual or tool annotation, the attribute value, the historical content and the historical position of field to be filled in this original document are annotated.

Further, the user can input these pieces of information into an electronic device.

After receiving these pieces of information, on the one hand, the electronic device can perform a smearing treatment on an area where the historical position is located according to the historical position of the field to be filled, to obtain a template image; on the other hand, use the inputted information as the annotation information of the template image.

Where a historical position of the field to be filled in the original image is a historical position of the field to be filled in the template image.

Exemplarily, the vicinity of an area to be smeared where the historical position is located in a gray scale image of the original image can be binarized by using an adaptive threshold. Pixels that are in an area with a small gray scale value and are not in the area to be smeared are recorded as a reference area. Further, a pixel belonging to the reference area around an outline of the area to be smeared is obtained as a reference pixel, and pixels on the outline of the area to be smeared are replaced according to a calculated weight according to the reference pixel, thereby achieving the effect of erasing. The replaced pixels are merged into the reference area. Such process is repeated continuously until the area to be smeared is replaced in its entirety.

Figure 6:
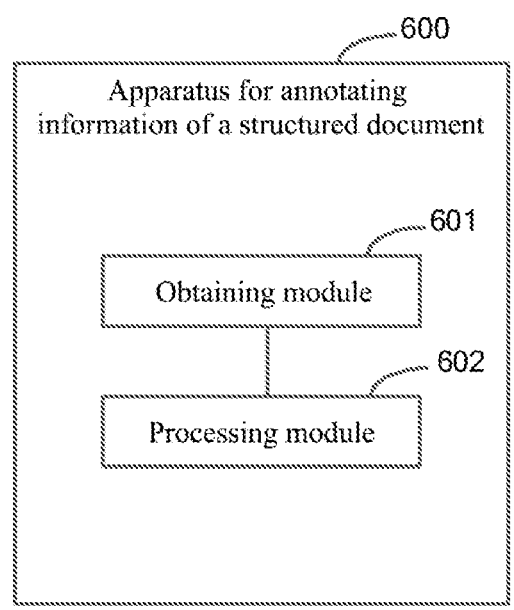
FIG. 6 is a module structure diagram of an apparatus for annotating information of a structured document provided by an embodiment of the present application.

FIG. 6 is a module structure diagram of an apparatus for annotating information of a structured document provided by an embodiment of the present application. As shown in FIG. 6, the apparatus includes:

an obtaining module 601, configured to obtain a template image of a structured document and at least one piece of annotation information of a field to be filled in the template image, where the annotation information includes an attribute value of the field to be filled, a historical content of the field to be filled and a historical position of the field to be filled in the template image; and a processing module 602, configured to generate target filling information of the field to be filled according to the attribute value of the field to be filled, the historical content of the field to be filled, and the historical position of the field to be filled in the template image, where the target filling information includes: a target filling position, a target filling content and a target filling format; and obtain an image of an annotated structured document according to the target filling information of the field to be filled.

In an optional implementation, the processing module 602 is specifically configured to:

generate the target filling content of the field to be filled according to the attribute value and the historical content of the field to be filled; and perform a position adjustment according to the historical position of the field to be filled in the template image, so as to obtain the target filling position of the field to be filled.

In an optional implementation, the processing module 602 is specifically configured to:

if the attribute value of the field to be filled exists in a preset corpus, randomly select a reference content from a content corresponding to the attribute value of the field to be filled in the preset corpus, and use the reference content as the target filling content of the field to be filled; and if the attribute value of the field to be filled does not exist in the preset corpus, and meanwhile a reference attribute value whose difference from the attribute value of the field to be filled is less than a preset value exists in the preset corpus, randomly select the reference content from a content corresponding to the reference attribute value in the preset corpus, and use the reference content as the target filling content of the field to be filled.

In an optional implementation, the processing module 602 is specifically configured to:

if neither the attribute value of the field to be filled nor the reference attribute value whose difference from the attribute value of the field to be filled is less than the preset value exist in the preset corpus, determine a part-of-speech of the historical content of the field to be filled, and generate the target filling content of the field to be filled according to whether the content corresponding to the part-of-speech of the historical content of the field to be filled exists in the preset corpus.

In an optional implementation, the processing module 602 is specifically configured to:

if the content corresponding to the part-of-speech of the historical content of the field to be filled exists in the preset corpus, randomly select a reference content from the content corresponding to the part-of-speech of the historical content of the field to be filled, and use the reference content as the target filling content of the field to be filled.

In an optional implementation, the processing module 602 is specifically configured to:

if the content corresponding to the part-of-speech of the historical content of the field to be filled does not exist in the preset corpus, use the historical content of the field to be filled as the target filling content of the field to be filled.

In an optional implementation, the processing module 602 is specifically configured to:

adjust a position of a field to be filled in an area where the historical position of the field to be filled in the template image is located; and adjust a position of at least one field to be filled in the template image in the same direction and distance; and if an adjusted position of a field to be filled overlaps with a position of a field other than the field to be filled, adjust a position of a field to be filled with an overlapping problem, to obtain the target filling position of the field to be filled.

In an optional implementation, the processing module 602 is specifically configured to:

if the field to be filled is a field in a table, at least one of the following is performed:

adjust positions of all rows of the table in the same direction and distance, and separately adjust a position of each column of the table in the same direction and distance.

In an optional implementation, the processing module 602 is specifically configured to:

adjust positions of all fields to be filled in the template image in the same direction and distance.

In an optional implementation, the processing module 602 is specifically configured to:

fill the target filling content at the target filling position of the template image according to the target filling format to obtain the image of the annotated structured document.

In an optional implementation, the annotation information also includes a color of the field to be filled.

The processing module 602 is specifically configured to:

fill the target filling content at the target filling position of the template image according to the target filling format and the color of the field to be filled, so as to obtain the image of the annotated structured document.

In an optional implementation, the processing module 602 is further configured to:

according to an attribute value of a field to be filled, a historical content of the field to be filled, and a historical position of each field to be filled in an original image, as instructed by a user, perform a smearing treatment on the original image to obtain the template image and at least one piece of annotation information of the field to be filled in the template image.

According to an embodiment of the present application, the present application further provides an electronic device and a readable storage medium.

Figure 7:
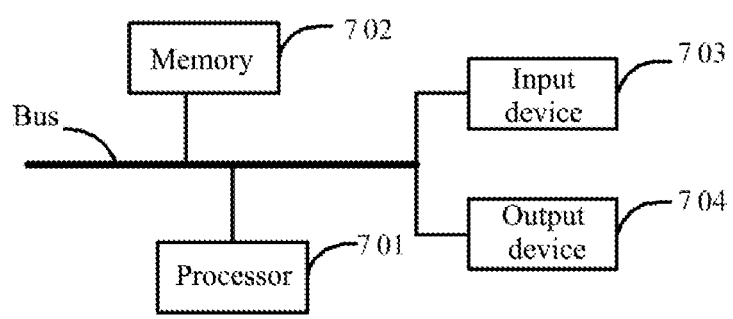
FIG. 7 is a block diagram of an electronic device of a method for annotating information of a structured document according to an embodiment of the present application.

As shown in FIG. 7, it is a block diagram of an electronic device of a method for annotating information of a structured document according to an embodiment of the present application. The electronic device is intended to represent various forms of digital computers, such as laptop computers, desktop computers, workstations, personal digital assistants, servers, blade servers, mainframe computers, and other suitable computers. The electronic device can also represent various forms of mobile devices, such as personal digital processing, cellular phones, smart phones, wearable devices and other similar computing devices. The components shown herein, their connections and relationships, and their functions are merely examples, and are not intended to limit the implementation of the present application described and/or claimed herein.

As shown in FIG. 7, the electronic device includes: one or more processors 701, a memory 702, and an interface for connecting various components, including a high-speed interface and a low-speed interface. The various components are connected to each other by using different buses, and can be installed on a common main board or be installed in other ways as required. The processor(s) may process instructions executable within the electronic device, including instructions stored in or on the memory to display graphical information of GUI on an external input/output device, such as a display device coupled to an interface. In other implementations, multiple processors and/or multiple buses may be used together with multiple memories, if necessary. Similarly, multiple electronic devices can be connected, and each device provides some necessary operations (for example, as a server array, a group of blade servers, or a multiprocessor system). In FIG. 7, one processor 701 is taken as an example.

The memory 702 is a non-transitory computer-readable storage medium provided in the present application. Where the memory stores instructions executable by at least one processor to cause the at least one processor to execute the method for annotating information of the structured document provided in the present application. The non-transitory computer-readable storage medium of the present application stores computer instructions for causing a computer to execute the method for annotating information of the structured document provided in the present application.

The memory 702, as a non-transitory computer-readable storage medium, can be used to store a non-transitory software program, a non-transitory computer executable program, and a module, such as the program instructions/modules corresponding to the method for annotating information of the structured document in the embodiments of the present application (for example, the obtaining module 601 and the processing module 602 shown in FIG. 6). The processor 701 performs various functional applications of the server and data processing by running a non-transitory software program, instructions, and a module stored in the memory 702, i.e., implementing the method for annotating information of the structured document in the above method embodiments.

The memory 702 may include a storage program area and a storage data area, where the storage program area may store an operating system and an application program required for at least one function; the storage data area may store data created based on the use of an electronic device for annotating information of the structured document. In addition, the memory 702 may include a high-speed random access memory, and may also include a non-transitory memory, such as at least one magnetic disk storage device, a flash memory device, or other non-transitory solid-state storage device. In some embodiments, the memory 702 may optionally include a memory remotely set with respect to the processor 701, and these remote memories may be connected to an electronic device for annotating information of the structured document through a network. Examples of the network include, but are not limited to, an Internet, an Intranet, a local area network, a mobile communication network, and combinations thereof.

The electronic device for the method for annotating information of the structured document may further include: an input device 703 and an output device 704. The processor 701, the memory 702, the input device 703, and the output device 704 may be connected through a bus or in other manner. An example of connecting by bus is shown in FIG. 7.

The input device 703 may receive inputted digital or character information and generate key signal input related to user settings and function control of the electronic device for annotating information of the structured document, such as touch screen, keypad, mouse, track pad, touch pad, pointing stick, one or more mouse buttons, track ball, joystick and other input devices. The output device 704 may include a display device, an auxiliary lighting device (for example, LED), a tactile feedback device (for example, vibration motor), and the like. The display device may include, but is not limited to, a liquid crystal display (LCD), a light emitting diode (LED) display, and a plasma display. In some embodiments, the display device may be a touch screen.

Various embodiments of the systems and the techniques described herein may be implemented in a digital electronic circuit system, an integrated circuit system, a dedicated ASIC (application specific integrated circuit), computer hardware, firmware, software, and/or combinations thereof. These various embodiments may include: being implemented in one or more computer programs that can be executed and/or interpreted on a programmable system including at least one programmable processor, which can be a special or general programmable processor, and can receive data and instructions from a storage system, at least one input device and at least one output device and transmit the data and the instructions to the storage system, the at least one input device and the at least one output device.

These computing programs (also known as programs, software, software applications, or codes) include machine instructions of a programmable processor and can be implemented using an advanced process and/or an object-oriented programming language, and/or an assembly/machine language. As used herein, terms "machine-readable medium" and "computer-readable medium" refer to any computer program product, device, and/or apparatus (for example, magnetic disk, optical disk, memory, programmable logic device (PLD)) for providing machine instructions and/or data to a programmable processor, including machine-readable medium that receives a machine instruction as a machine-readable signal. The term "machine-readable signal" refers to any signal for providing a machine instruction and/or data to a programmable processor.

To provide interaction with a user, the systems and techniques described herein can be implemented on a computer, and the computer has: a display device (for example, a CRT (cathode ray tube) or an LCD (liquid crystal display) monitor) for displaying information to the user; and a keyboard and a pointing device (for example, a mouse or a track ball) through which the user can provide an input to the computer. Other types of devices can also be used to provide the interaction with the user; for example, a feedback provided to the user can be any form of sensory feedback (for example, visual feedback, auditory feedback, or tactile feedback); and the input from the user can be received in any form (including acoustic input, voice input, or tactile input).

The systems and techniques described herein can be implemented on a computing system including back-end components (for example, as a data server), or a computing system including middleware components (for example, an application server), or a computing system including front-end components (for example, a user computer with a graphical user interface or a web browser through which the user can interact with the implementation of the systems and technologies described herein), or a computing systems including any combination of the back-end components, the middleware components, or the front-end components. The components of the systems can be interconnected through digital data communication (for example, communication network) in any form or medium. Examples of the communication networks include local area network (LAN), wide area network (WAN), and Internet.

A computer system may include both a client and a server. The client and the server are generally far away from each other and usually interact over a communication network. A client-server relationship is generated by running a computer program having the client-server relationship on a corresponding computer.

It should be understood that steps can be reordered, added or deleted using various forms of processes shown above. For example, the steps described in the present application can be executed in parallel, sequentially or in a different order, so long as the desired result of the technical solution disclosed in the present application can be achieved, there is no limitation on this herein.

The above specific embodiments do not constitute a limitation on the scope of protection of the present application. Those skilled in the art should understand that various modifications, combinations, sub-combinations and substitutions can be made according to design requirements and other factors. Any modification, equivalent substitution and improvement made within the spirit and principle of the present application shall be included in the scope of protection of the present application.

What is claimed is:

1. A method for annotating information of a structured document, applied to an electronic device, comprising:
    performing a smearing treatment on an original image of the structured document according to a historical position of a field to be filled in the original image to obtain a template image of the structured document;
    obtaining at least one piece of annotation information of a field to be filled in the template image, wherein the annotation information comprises an attribute value of the field to be filled, a historical content of the field to be filled, and a historical position of the field to be filled in the template image;
    generating, according to the attribute value of the field to be filled, the historical content of the field to be filled and the historical position of the field to be filled in the template image, target filling information of the field to be filled, wherein the target filling information comprises: a target filling position, a target filling content and a target filling format;
    obtaining, according to the target filling information of the field to be filled, an image of an annotated structured document; and
    using the obtained image of the annotated structured document for training an image text recognition algorithm for extracting a structured document;
    wherein the generating, according to the attribute value of the field to be filled, the historical content of the field to be filled and the historical position of the field to be filled in the template image, the target filling information of the field to be filled, comprises:
        generating, according to the attribute value and the historical content of the field to be filled, the target filling content of the field to be filled; and
        performing a position adjustment according to the historical position of the field to be filled in the template image to obtain the target filling position of the field to be filled;
    wherein the generating, according to the attribute value and the historical content of the field to be filled, the target filling content of the field to be filled comprises:
        if the attribute value of the field to be filled exists in a preset corpus, randomly selecting a reference content from a content corresponding to the attribute value of the field to be filled in the preset corpus, and using the reference content as the target filling content of the field to be filled;
        if the attribute value of the field to be filled does not exist in the preset corpus and meanwhile a reference attribute value whose difference from the attribute value of the field to be filled is less than a preset value exists in the preset corpus, randomly selecting a reference content from a content corresponding to the reference attribute value in the preset corpus, and using the reference content as the target filling content of the field to be filled; and
        if neither the attribute value of the field to be filled nor the reference attribute value whose difference from the attribute value of the field to be filled is less than the preset value exist in the preset corpus, determining a part-of-speech of the historical content of the field to be filled, and generating the target filling content of the field to be filled according to whether a content corresponding to the part-of-speech of the historical content of the field to be filled exists in the preset corpus.

2. The method according to claim 1, wherein the generating the target filling content of the field to be filled according to whether the content corresponding to the part-of-speech of the historical content of the field to be filled exists in the preset corpus, comprises: if the content corresponding to the part-of-speech of the historical content of the field to be filled exists in the preset corpus, randomly selecting a reference content from the content corresponding to the part-of-speech of the historical content of the field to be filled, and using the reference content as the target filling content of the field to be filled.

3. The method according to claim 1, wherein the generating the target filling content of the field to be filled according to whether the content corresponding to the part-of-speech of the historical content of the field to be filled exists in the preset corpus, comprises: if the content corresponding to the part-of-speech of the historical content of the field to be filled does not exist in the preset corpus, using the historical content of the field to be filled as the target filling content of the field to be filled.

4. The method according to claim 1, wherein the performing the position adjustment according to the historical position of the field to be filled in the template Page 3 of 8 adjusting a position of a field to be filled in an area where the historical position of the field to be filled in the template image is located; adjusting a position of at least one field to be filled in the template image in the same direction and distance; and if an adjusted position of a field to be filled overlaps with a position of a field other than the field to be filled, adjusting a position of a field to be filled with an overlapping problem to obtain the target filling position of the field to be filled.

5. The method according to claim 4, wherein the adjusting the position of at least one field to be filled in the template image in the same direction and distance, comprises:
if the field to be filled is a field in a table, performing at least one of the following:
adjusting positions of all rows of the table in the same direction and distance, and separately adjusting a position of each column of the table in the same direction and distance.

6. The method according to claim 4, wherein the adjusting the position of at least one field to be filled in the template image in the same direction and distance, comprises:
adjusting positions of all fields to be filled in the template image in the same direction and distance.

7. The method according to claim 1, wherein the obtaining, according to the target filling information of the field to be filled, the image of the annotated structured document, comprises:
filling the target filling content at the target filling position of the template image according to a target filling format to obtain the image of the annotated structured document.

8. The method according to claim 7, wherein the annotation information further comprises a color of the field to be filled;
the filling the target filling content at the target filling position of the template image according to the target filling format to obtain the image of the annotated structured document, comprises:
filling the target filling content at the target filling position of the template image according to the target filling format and the color of the field to be filled, to obtain the image of the annotated structured document.

9. An apparatus for annotating information of a structured document, comprising:
at least one processor; and
a memory communicatively connected to the at least one processor; wherein
the memory stores instructions executable by the at least one processor, and the instructions are executed by the at least one processor, to cause the at least one processor to:
perform a smearing treatment on an original image of the structured document according to a historical position of a field to be filled in the original image to obtain a template image of the structured document;
obtain at least one piece of annotation information of a field to be filled in the template image, wherein the annotation information comprises an attribute value of the field to be filled, a historical content of the field to be filled and a historical position of the field to be filled in the template image;
generate target filling information of the field to be filled according to the attribute value of the field to be filled, the historical content of the field to be filled, and the historical position of the field to be filled in the template image, wherein the target filling information comprises: a target filling position, a target filling content and a target filling format;
obtain an image of an annotated structured document according to the target filling information of the field to be filled; and
use the obtained image of the annotated structured document for training an image text recognition algorithm for extracting a structured document;
the processor is configured to:
generate, according to the attribute value and the historical content of the field to be filled, the target filling content of the field to be filled; and
perform a position adjustment according to the historical position of the field to be filled in the template image to obtain the target filling position of the field to be filled;
the processor is configured to:
if the attribute value of the field to be filled exists in a preset corpus, randomly select a reference content from a content corresponding to the attribute value of the field to be filled in the preset corpus, and use the reference content as the target filling content of the field to be filled;
if the attribute value of the field to be filled does not exist in the preset corpus and meanwhile a reference attribute value whose difference from the attribute value of the field to be filled is less than a preset value exists in the preset corpus, randomly select a reference content from a content corresponding to the reference attribute value in the preset corpus, and use the reference content as the target filling content of the field to be filled; and
if neither the attribute value of the field to be filled nor the reference attribute value whose difference from the attribute value of the field to be filled is less than the preset value exist in the preset corpus, determine a part-of-speech of the historical content of the field to be filled, and generate the target filling content of the field to be filled according to whether a content corresponding to the part-of-speech of the historical content of the field to be filled exists in the preset corpus.

10. An electronic device, comprising:
at least one processor; and
a memory communicatively connected to the at least one processor; wherein
the memory stores instructions executable by the at least one processor, and the instructions are executed by the at least one processor, to cause the at least one processor to execute the method according to claim 1.

11. A non-transitory computer-readable storage medium storing computer instructions, wherein the computer instructions are used to cause a computer to execute the method according to claim 1.

* * * * *